United States Patent [19]

Romano

[11] Patent Number: 4,946,181
[45] Date of Patent: Aug. 7, 1990

[54] SAFETY DEVICE FOR THE STEERING UNITS OF BICYCLES AND THE LIKE

[75] Inventor: Antonio Romano, Padova, Italy
[73] Assignee: Campagnolo S.r.l., Vicenza, Italy
[21] Appl. No.: 341,179
[22] Filed: Apr. 21, 1989
[30] Foreign Application Priority Data Apr. 21, 1988 [IT] Italy ................. 67372 A/88

[51] Int. Cl.⁵ ............................................. B62K 21/04
[52] U.S. Cl. ................... 280/279; 280/280; 74/502.4; 74/502.6; 411/190
[58] Field of Search .............. 280/279, 280, 264, 263, 280/270, 271, 272, 274, 288.4, 281.1; 74/502.2, 502.4, 502.6; 403/289, 290; 411/974, 965, 190; 292/307 B, DIG. 2; 384/488, 489

[56] References Cited

U.S. PATENT DOCUMENTS

| 501,493 | 7/1893 | Crosby | 280/272 |
| 1,541,963 | 10/1924 | Jasper | 411/190 |
| 1,808,969 | 11/1928 | Porter | 292/307 B |
| 1,814,412 | 7/1929 | Rutten | 292/307 B |
| 1,897,666 | 9/1930 | Hoagland | 411/190 |

FOREIGN PATENT DOCUMENTS

| 911467 | 4/1954 | Fed. Rep. of Germany | 74/502.2 |
| 947995 | 7/1949 | France | 280/280 |
| 1097479 | 7/1955 | France | 280/271 |
| 302483 | 10/1965 | Netherlands | 280/280 |

Primary Examiner—Charles A. Marmor
Assistant Examiner—Anne Marie Boehler
Attorney, Agent, or Firm—Sughrue, Mion, Zinn, Macpeak & Seas

[57] ABSTRACT

A safety device for bicycles, for preventing unscrewing, comprises a ring element which can be mounted coaxially on the outer ring of the upper steering bearing and on the lock nut to lock them in position on the tubular sleeve of the fork mounted rotatably in the steering tube of the frame. The ring element is clamped onto the ring of the bearing and the lock nut so as to prevent the accidental unscrewing of the lock nut. It also has a radial appendage which is adapted to act as an abutment for the end of the sheath of a flexible brake-operating cable.

5 Claims, 2 Drawing Sheets

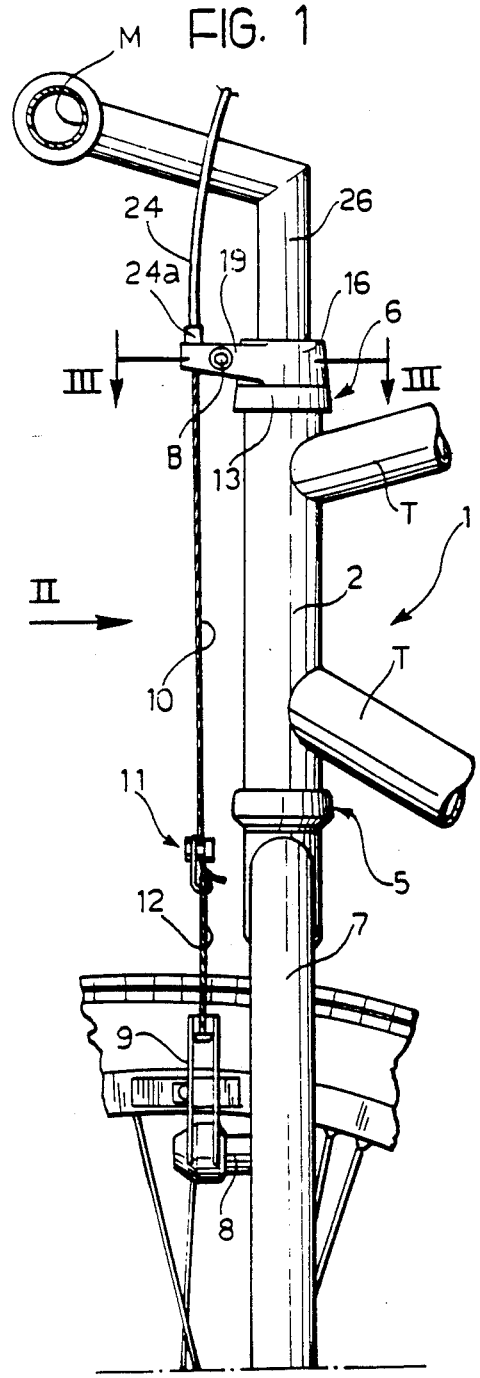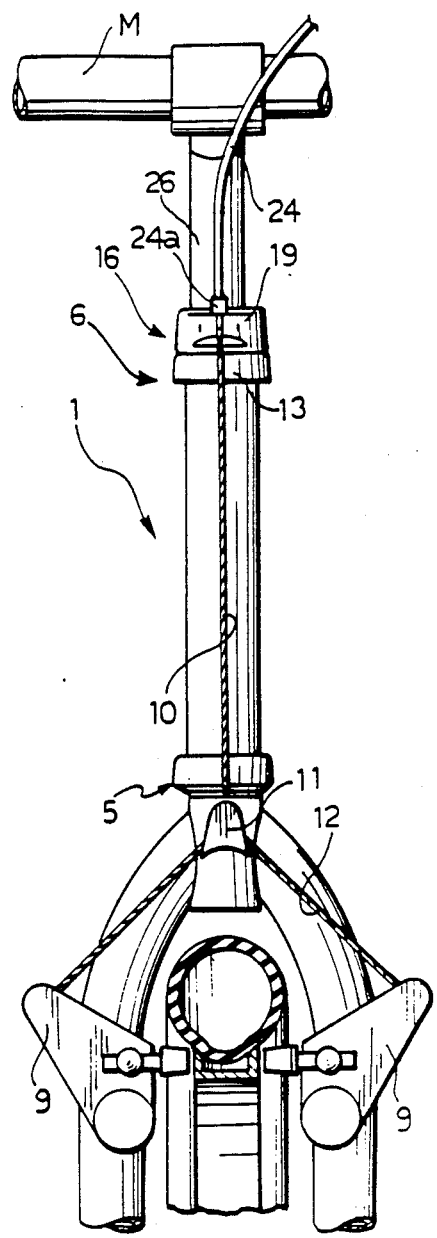

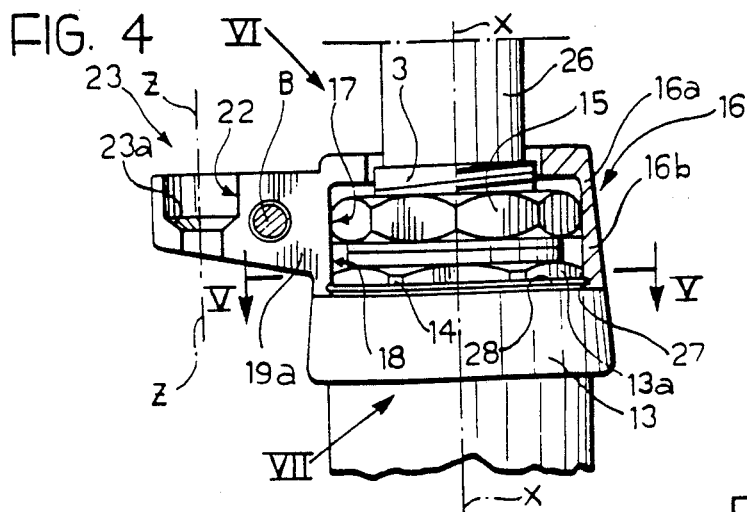
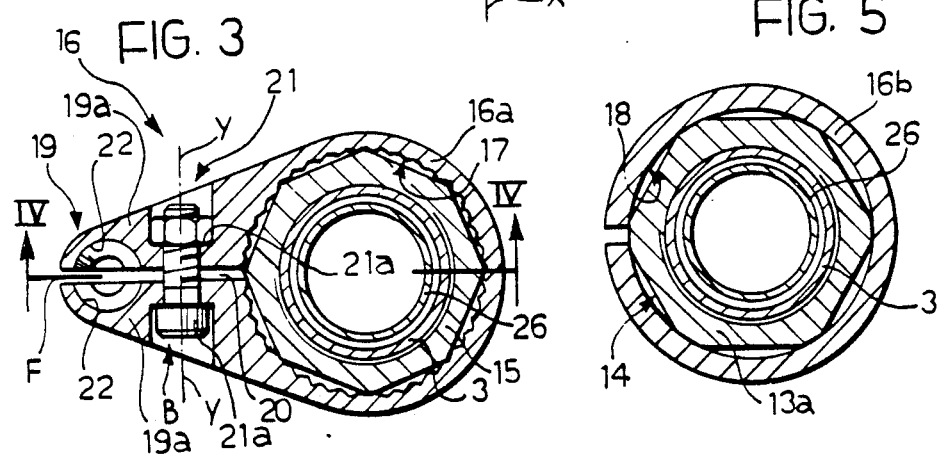
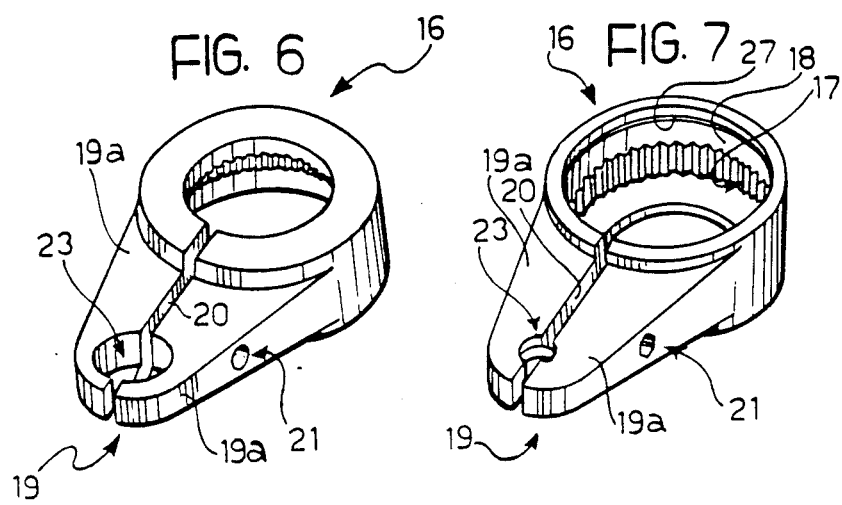

SAFETY DEVICE FOR THE STEERING UNITS OF BICYCLES AND THE LIKE

BACKGROUND OF THE INVENTION

The present invention relates to a safety device for the steering units of bicycles, motorcycles and the like provided with a steering tube within which a sleeve is rotatably mounted with the interposition of rolling bearings, an upper bearing comprising a first ring mounted on the steering tube, and a second ring screwed onto a threaded portion of the sleeve and locked in position by a lock nut.

In current bicycles, particularly bicycles of the "mountain bike" type used mainly on rough tracks, the lock nut and consequently the ring of the upper bearing which is screwed onto the sleeve of the fork often work loose as a result of the vibrations to which the steering unit is subjected. If this loosening is not corrected promptly by the adjustment of the play in the steering bearings, it may cause damage to the rolling tracks and give rise to the malfunctioning of the steering unit.

SUMMARY OF THE INVENTION

The object of the present invention is to provide a safety device which enables this problem to be eliminated simply and cheaply.

According to the invention, this object is achieved by virtue of the fact that the safety device comprises a ring element which is adapted to be mounted coaxially on the second ring of the bearing and on the lock nut to fix them firmly together and prevent them from accidentally becoming unscrewed.

The ring element preferably comprises a first portion having an inner surface with a polygonal cross-section adapted to cooperate with the polygonal outer surface of the lock nut, and a second portion having a circular cylindrical internal surface adapted to be clamped to the second ring of the bearing.

The lock nut is thus firmly fixed to the bearing ring, preventing it from working loose as a result of vibrations.

Moreover, the ring element has a radial appendage which is adapted to act as an abutment for a sheath of a flexible breake-operating cable.

By virtue of the latter characteristic, the ring element according to the invention can to advantage replace the devices currently used as abutments for the brake-cable sheaths, such as, for example, brackets situated between the ring of the bearing and the lock nut or holes provided in correspondence with the so-called "stem" of the handlebars.

BRIEF DESCRIPTION OF THE DRAWINGS

Further characteristics and advantages of the present invention will become clear from the detailed description which follows with reference to the appended drawings, provided by way of non-limiting example, in which:

FIG. 1 is a side view of a steering unit provided with a device according to the invention, FIG. 2 is a view taken on the arrow II of FIG. 1, FIG. 3 is a section taken on the line III—III of FIG. 1, on an enlarged scale, FIG. 4 is a section taken on the line IV—IV of FIG. 3, FIG. 5 is a section taken on the line V—V of FIG. 4, FIG. 6 is a perspective view of the device, taken on the arrow VI of FIG. 4, and FIG. 7 is a perspective view of the device, taken on the arrow VII of FIG. 4.

DETAILED DESCRIPTION OF THE INVENTION

With reference to the drawings, a steering unit for bicycles is generally indicated 1 and comprises a steering tube 2 which is welded to tubes of the frame T and within which a sleeve 3 is rotatably mounted with the interposition of a lower rolling bearing 5 and an upper rolling bearing 6. The sleeve 3 is fixed firmly at the bottom to tubes 7 of the fork, to which pins 8 are welded for the articulation of levers 9 of a brake of the "cantilever" type operated by a flexible cable 10 connected at 11 to an auxiliary cable 12. A stem 26 connected to a handlebar M is fixed coaxially within the sleeve 3, in known manner.

As is known, the upper bearing 6 of the steering unit 1 comprises an outer cup-shaped ring 13 which is screwed onto an outer threaded portion of the sleeve 3 and carries a portion 13a whose outer wall is of polygonal cross-section with chamfered corners 14. The outer ring 13 is provided with a rolling track for rolling bodies which cooperates with a corresponding rolling track of an inner ring connected to the upper end of the steering tube 2 (the details of the bearing are not illustrated). The adjustment of the play of the bearing 6 is achieved by the screwing-up or unscrewing of the outer ring 13 by means of a spanner which acts on the polygonal portion 13a.

In order to lock the outer ring 13 in position after its adjustment, a lock nut 15 which abuts the portion 13a of the ring itself frontally is screwed onto the sleeve 3.

According to the invention, a split ring 16, for example, of plastics material or light alloy, is mounted on the portion 13a of the outer ring 13 and on the lock nut 15, and has a first portion 16a provided with a toothed, cylindrical inner surface 17 and a second portion 16b provided with a circular cylindrical inner surface 18.

The split ring 16 has a radial appendage 19 which is substantially triangular in plan and is divided into two half-appendages 19a by a longitudinal split, indicated 20 in the drawings.

The appendage 19 has a through-hole 21 for housing a bolt B, which has an axis Y—Y perpendicular to the axis X—X of the split ring 16 and is provided with annular shoulders 21 adapted to cooperate respectively with the head of the bolt B and with its nut.

Each half-appendage 19a also has a shaped groove 22 which is adapted to define, with the corresponding groove in the opposite half-appendage (in the configuration illustrated in the drawings, in which the half-appendages 19a face each other), a through-hole 23 having an axis Z—Z parallel to the axis X—X of the split ring 16 and provided with an annular shoulder 23a adapted to cooperate, in the mounted configuration of the device, with an end 24a of a sheath 24 of the flexible cable 10.

The split ring 16 can be mounted on the portion 13a of the outer ring 13 of the outer bearing 6 and on the lock nut 15 simultaneously with the mounting of the sleeve 3, or subsequently thereto, by making use of the resilience of the split ring which enables the two radial half-appendages 19a to be moved apart. In any case, the clamping together of the half-appendages 19a by means of the bolt B causes, on the one hand, the engagement between the toothed surface 17 of the first portion 16a of the split ring 16 and the lock nut 15 and, on the other hand, the frictional engagement between the chamfered corners 14 of the portion 13a of the ring 13 and the circular cylindrical surface 18 of the second portion 16b of the split ring 16. The lock nut 15 is thus firmly fixed to the ring 13 of the bearing 6.

In order to connect the split ring 16 to the ring 13 axially, the second portion 16b of the split ring is provided with a circumferential groove 27 which is adapted to cooperate with a corresponding circumferential ridge 28 on the hexagonal portion 13a of the ring 13 (FIG. 4). The groove 17 and the ridge 28 are resiliently snap-engaged.

The end 24a of the sheath 24 can be mounted in the seat 23a in the clamped configuration of the split ring 16 by virtue of the presence of a slot F between the half-appendages 19a, the slot enabling the passage of the cable 10 until it is positioned along the axis Z—Z of the hole 23.

I claim:

1. A safety device for the steering unit of a bicycle, motorcycle and the like provided with a steering tube within which a sleeve is rotatably mounted with the interposition of rolling bearing including an upper bearing comprising a first ring mounted on the steering tube and a second ring screwed onto a threaded portion of the sleeve and locked in position by a lock nut having an external polygonal surface, wherein said safety device comprises a ring element including a first portion having an internal surface of polygonal cross-section adapted to engage the external polygonal surface of the lock nut, a second portion having a circular cylindrical internal surface adapted to be clamped onto the second ring of the bearing and clamping means for clamping said ring element coaxially on the second ring on the bearing and on the lock nut to fix them firmly together and prevent them from accidentally becoming unscrewed from each other.

2. A device according to claim 1, wherein the ring element has a longitudinal split which enables it to be clamped onto the second ring and said clamping means comprises a nut-and-bolt system.

3. A device according to claim 2, wherein the ring element has a radial appendage which is adapted to act as an abutment for a sheath of a flexible brake-operating cable.

4. A device according to claim 1, wherein the said element has:

a first portion provided with a toothed internal cylindrical wall adapted to engage the lock nut, a second portion provided with a circular cylindrical wall adapted to engage the second ring of the bearing, a shaped radial appendage connected to the ring element, a longitudinal split in correspondence with the appendage and defining two half-appendages which can be opened out resiliently, a first through-hole in the radial appendage, having an axis perpendicular to the axis of the ring element, for housing the stem of a bolt for clamping the two half-appendages, and a second through-hole in correspondence with one end of the radial appendage, which has an axis parallel to the axis of the ring element, and which is divided into two half-recesses by the longitudinal split and is provided with a recessed seat adapted to act as an abutment for the end of a sheath of a cable which passes through the whole.

5. A device according to claim 1, wherein the second portion of the ring element has an internal circumferential groove adapted to engage a corresponding circumferential ridge on the second ring of the bearing to connect the ring element axially thereto.

* * * * *